(12) United States Patent
Freakes

(10) Patent No.: US 10,513,076 B1
(45) Date of Patent: Dec. 24, 2019

(54) 3D PRINTING DEVICES AND METHODS

(71) Applicant: Anthony Freakes, Lawrenceville, NJ (US)

(72) Inventor: Anthony Freakes, Lawrenceville, NJ (US)

( * ) Notice: Subject to any disclaimer, the term of this patent is extended or adjusted under 35 U.S.C. 154(b) by 0 days.

(21) Appl. No.: 16/001,305

(22) Filed: Jun. 6, 2018

Related U.S. Application Data

(60) Provisional application No. 62/515,701, filed on Jun. 6, 2017.

(51) Int. Cl.

| | | |
|---|---|---|
| *B33Y 10/00* | (2015.01) | |
| *B33Y 30/00* | (2015.01) | |
| *B29C 64/118* | (2017.01) | |
| *B29C 64/236* | (2017.01) | |
| *B29C 64/209* | (2017.01) | |
| *B29C 64/232* | (2017.01) | |
| *B29C 64/194* | (2017.01) | |
| *B29C 64/295* | (2017.01) | |
| *B29C 35/16* | (2006.01) | |

(52) U.S. Cl.
CPC .......... *B29C 64/118* (2017.08); *B29C 64/194* (2017.08); *B29C 64/209* (2017.08); *B29C 64/232* (2017.08); *B29C 64/236* (2017.08); *B29C 64/295* (2017.08); *B33Y 10/00* (2014.12); *B33Y 30/00* (2014.12); *B29C 2035/1658* (2013.01)

(58) Field of Classification Search
CPC ..... B29C 64/188; B29C 64/40; B29C 64/118; B29C 47/02; B29C 70/68
See application file for complete search history.

(56) References Cited

U.S. PATENT DOCUMENTS

| | | | | |
|---|---|---|---|---|
| 5,121,329 A * | 6/1992 | Crump | .................... | B22F 3/115 228/180.5 |
| 5,578,227 A * | 11/1996 | Rabinovich | ............ | B23K 26/34 219/121.63 |
| 5,936,861 A * | 8/1999 | Jang | ...................... | B29C 70/384 700/98 |
| 6,280,784 B1 * | 8/2001 | Yang | .................... | A21C 11/163 426/231 |
| 6,280,785 B1 * | 8/2001 | Yang | .................... | A21C 11/163 425/112 |
| 7,700,016 B2 * | 4/2010 | Wigand | ................. | B33Y 30/00 264/49 |
| 8,119,053 B1 * | 2/2012 | Bedal | ..................... | B33Y 10/00 264/308 |
| 8,226,395 B2 * | 7/2012 | Pax | ....................... | B29C 64/106 425/174.4 |

(Continued)

*Primary Examiner* — Atul P. Khare
(74) *Attorney, Agent, or Firm* — Servilla Whitney LLC

(57) ABSTRACT

3D printers include a feed stepper motor coupled to an extruder, a platen positioned adjacent the extruder, a platen support coupled to a platen lifter, and directional stepper motors, wherein the extruder comprises an air scoop, extruder nozzle and heater, wherein the heater is positioned to heat the extruder nozzle and air to provide heated air and the air scoop is configured and positioned to route the heated air which is emitted adjacent the extruder nozzle directly onto the surface of a workpiece positioned on the platen. A feed stepper motor may include a hollow bore motor shaft. A substrate made of the same material being extruded may be provided. A method of 3D printing employs such a substrate.

7 Claims, 5 Drawing Sheets

(56) References Cited

U.S. PATENT DOCUMENTS

| | | | | |
|---|---|---|---|---|
| 9,296,036 | B2* | 3/2016 | Bush | C22F 1/183 |
| 9,399,323 | B1* | 7/2016 | Lu | B33Y 30/00 |
| 9,714,318 | B2* | 7/2017 | Jaker | C08G 63/06 |
| 9,846,556 | B2* | 12/2017 | Cudak | G06F 3/121 |
| 10,029,415 | B2* | 7/2018 | Swanson | B33Y 30/00 |
| 10,059,057 | B2* | 8/2018 | Schirtzinger | B29C 70/30 |
| 10,173,409 | B2* | 1/2019 | Roviaro | B33Y 10/00 |
| 2002/0129485 | A1* | 9/2002 | Mok | G05B 19/4099 |
| | | | | 29/527.2 |
| 2016/0136897 | A1* | 5/2016 | Nielsen-Cole | B33Y 30/00 |
| | | | | 425/131.1 |
| 2016/0298218 | A1* | 10/2016 | Kilmer | C22C 21/08 |
| 2017/0066194 | A1* | 3/2017 | Bromer | B33Y 30/00 |
| 2017/0120517 | A1* | 5/2017 | Shimoyama | B05B 7/16 |
| 2017/0297097 | A1* | 10/2017 | Gibson | B33Y 30/00 |
| 2018/0043612 | A1* | 2/2018 | Gray | B33Y 30/00 |
| 2018/0043618 | A1* | 2/2018 | Shemelya | B29C 70/82 |
| 2018/0207863 | A1* | 7/2018 | Porter | B29C 64/129 |
| 2018/0326658 | A1* | 11/2018 | Saito | B29C 35/16 |

* cited by examiner

3D PRINTING DEVICES AND METHODS

CROSS-REFERENCE TO RELATED APPLICATIONS

This application claims the benefit of U.S. Provisional Patent Application No. 62/515,701 filed Jun. 6, 2017, the entirety of which is incorporated herein by reference.

FIELD OF THE INVENTION

The invention relates to the field of 3D printers.

BACKGROUND OF THE INVENTION

Three-dimensional (3D) printers employ a method of feeding plastic filament into a heated nozzle, which then deposits a bead of softened plastic, using Cartesian x-y-z motion, to build a thin layer of plastic. The extent of the layer is determined using software, which slices a solid computer model into thin layers. Each layer is progressively "printed" and built on top of the previous layer, until the complete solid model is realized as solid plastic.

SUMMARY OF THE INVENTION

Currently available 3D printing devices have some serious drawbacks which lead to difficulties in producing, and imperfections in, finished 3D products.

First, the parts produced by such devices are weak in tension. The attachment between layers is dependent on the adhesion between a cool previous surface, and a hot plastic bead. This adhesion is weak, and leads to part separation, when loaded in tension perpendicular to the layer surface.

Second, because of the bulkiness and relatively large mass of the platen on which a part is printed, most machine designers elect to move the lighter nozzle in the 'x' and "y" directions. When the nozzle moves and abruptly stops, as is constantly happening, the extruded plastic bead is free of any support of an orifice, and it does not stop in exact unison with the nozzle. It therefore moves further than intended, and deposits in an unintended way, which produces inaccuracy.

Third, most of the 3D printing devices currently available have size capacity in excess of 4"×4"×4" and as users are usually impatient to see a finished part, the motion is quickened. This fast motion causes wear and abrupt stops, which results in vibration and inaccuracy.

Fourth, there is difficulty in establishing a first layer in currently available 3D printers. The first layer must adhere to the surface of the platen. Additionally, the adhesion must be weak enough to allow removal of the finished part. If the adhesion does not maintain stability, the part can be ruined before it is finished.

Fifth, the first layer adhesion is not strong enough to prevent cooling distortion. The lowest surface of the part bends convexly, away from the flat surface, because the material above thermally contracts, and produces large bending forces. This causes separation from the platen, and increases the likelihood of the failure mentioned above. Also, even if the part is successfully completed, the bottom surface of the part is not flat.

Sixth, the frame of most currently available 3D printers is unnecessarily large, because of the space needed to house the stepper motors and the lead screws, gearing and belts. This largeness increases deflections of the frame which in turn contributes to inaccuracy.

Seventh, in currently available 3D printers, the supply of material is accomplished by using a round filament which is supplied on reels. This filament is then fed by a friction wheel into the hot nozzle. This method is relatively bulky, especially when multiple nozzles are required for high production. The bulkiness of the devices makes the device troublesome to manage and makes the device more prone to producing inferior product.

The foregoing drawbacks are solved by the 3D printing devices disclosed herein.

As to the first drawback listed above, the reason for the weakness is that the temperature of the surface onto which the bead is being deposited is too low and therefore the hot bead does not merge strongly with the cool surface. This is remedied by heating the surface onto which the bead is being deposited. In one embodiment the heating is limited to the specific area of the surface where the bead is being deposited.

The heating process may be performed in various ways, such as but not limited to localized laser heating, etc. In one embodiment, heated air may be employed. In an exemplary embodiment, air may be heated by the same heater which heats the bead, and confined to emit around the extruder nozzle directly onto the surface. Regardless of which way the surface is about to move, relative to the nozzle, there will be a hot surface with which to merge. It will be apparent to those skilled in the art that the temperature employed in this heating process should be kept below the temperature necessary to soften or deform the surface of the material.

As to the second drawback listed above, devices disclosed herein include a platen and associated moving mechanism that are extremely light weight, which are easily moved in the 'x' and 'y' directions while the extruding nozzle is kept stationary. In this way, when the relative motion of the moving platen stops, there is no sideways motion of the unsupported plastic bead, between the nozzle tip and the workpiece surface, and therefore a reduction in unwanted deposit. By comparison, in the prior art, when the nozzle is the moving element, each change in motion causes the unsupported bead's inertia to place plastic in unwanted, unspecified places, resulting in inaccurate parts. As to the third drawback listed above, in one or more embodiments a 3D printing device is provided which can print small parts with slower movements and have greater accuracy and longer machine part life. In one embodiment, a 3D printing device is provided which has an absolute physical capacity of 1.383"×1.383"×1.413", on which parts can be made which are no larger than 1.350"×1.350"×1.375". Such devices can be used in cases in which there is a need for extreme accuracy in a part of a larger part made on a less accurate 3D printer. Devices of this particular embodiment can provide the local accuracy in a part which is then merged into the larger part.

As to the fourth and fifth drawbacks, methods are disclosed in which a premade thin surface layer, or substrate, made from the same material being extruded, is provided which is physically clamped to the platen. Printing then proceeds with the substrate being heated and printed on, as if it were any layer. The resulting part is then removed by loosening the clamps. The initial premade thin surface layer (substrate) is then trimmed if, when and where necessary. Although this trimming is time consuming, the well spent time is compensated by the perfectly flat bottom surface, and reduced loss of almost-finished parts becoming loosened, when using the adhesive method.

As to the sixth drawback, in one or more embodiments 3D printing devices are provided which include stepper motors with hollow bores. This allows the lead screw, and nut, to be housed within the stepper motor. The resulting frame is compact and very rigid.

As to the seventh drawback, in one or more embodiments a square sectioned filament is employed. This allows a much more compact square-bored bushing with a threaded nut feeding the square sectioned filament. This compactness allows multiple orifices, which increases productivity.

In accordance with one or more embodiments, a 3D printing device includes a feed stepper motor coupled to an extruder, a platen positioned adjacent the extruder, a platen support coupled to a platen lifter, an x-direction stepper motor operably coupled to an x-direction stepper motor positioner, and a y-direction stepper motor operably coupled to a y-direction stepper motor positioner, wherein the x- and y-direction stepper motor positioners are operably coupled to the platen support, and further including a z-direction stepper motor operably coupled to the platen lifter, wherein the extruder comprises an air scoop, extruder nozzle and heater, wherein the heater is positioned to heat the extruder nozzle and air to provide heated air and the air scoop is configured and positioned to route the heated air which is emitted through an air scoop orifice adjacent the extruder orifice directly onto the surface of a workpiece positioned on the platen. In some embodiments the extruder orifice has a diameter of about 0.004-0.01 inches. In some embodiments the extruder orifice is about 0.006 inches in diameter. In some embodiments the air scoop orifice has a diameter of about 0.1-0.2 inches. In some embodiments the air scoop orifice is about 0.125 inches in diameter. The platen lifter may include a ferric material and an end of the platen support proximal the platen lifter may include a magnet.

In one or more embodiments the feed stepper motor, the x-direction stepper motor, y-direction stepper motor and z-direction stepper motor are operably coupled to a computing device operable to carry out computing activity in connection with implementing the functions and actions of the 3D printer device.

In some embodiments the feed stepper motor includes a hollow-bore motor shaft having a bore configured and operable to receive and feed to the extruder a filament for use in creating a 3D workpiece. The bore may have a square cross-section.

In still further embodiments the 3D printing device includes a substrate made from the same material as a filament to be extruded through the extruder coupled to the platen. The 3D printing device may have at least one clamp for securing the substrate to the platen. The at least one clamp may be positioned on the platen. The substrate may include a clamp element permitting it to be clamped to the platen.

In yet a further embodiment a 3D printing device includes a feed stepper motor coupled to an extruder, a platen positioned adjacent the extruder, a platen support coupled to a platen lifter, an x-direction stepper motor operably coupled to an x-direction stepper motor positioner, and a y-direction stepper motor operably coupled to a y-direction stepper motor positioner, wherein the x- and y-direction stepper motor positioners are operably coupled to the platen support, and further including a z-direction stepper motor operably coupled to the platen lifter, wherein the feed stepper motor comprises a hollow-bore motor shaft having a bore configured and operable to receive and feed to the extruder a filament for use in creating a 3D workpiece. The bore may have a square cross-section. The platen lifter may include a ferric material and an end of the platen support proximal the platen lifter may include a magnet. The feed stepper motor, the x-direction stepper motor, y-direction stepper motor and z-direction stepper motor may be operably coupled to a computing device operable to carry out computing activity in connection with implementing the functions and actions of the 3D printer device. In one or more embodiments the extruder includes an air scoop, extruder nozzle and heater, wherein the heater is positioned to heat the extruder nozzle and air to provide heated air and the air scoop is configured and positioned to route the heated air which is emitted through an air scoop orifice adjacent the extruder orifice directly onto the surface of a workpiece positioned on the platen. In some embodiments the extruder orifice has a diameter of about 0.004-0.01 inches. In some embodiments the extruder orifice is about 0.006 inches in diameter. In some embodiments the air scoop orifice has a diameter of about 0.1-0.2 inches. In some embodiments the air scoop orifice is about 0.125 inches in diameter. In some embodiments the 3D printing device includes a substrate made from the same material as a filament to be extruded through the extruder coupled to the platen. The 3D printing device may have at least one clamp for securing the substrate to the platen. The at least one clamp may be positioned on the platen. The substrate may include a clamp element permitting it to be clamped to the platen.

In yet still further embodiments, a method of 3D printing includes providing, for a 3D printing device, a substrate made from the same material as a filament to be extruded through the extruder, the substrate configured and operable to be coupled to a platen of the 3D printing device, coupling the substrate to the platen, heating the substrate, creating a workpiece on the substrate by applying extruded material to the substrate, and removing the substrate and the workpiece from the platen. The method may further include removing at least a part of the substrate from the workpiece.

Given above is a simplified summary in order to provide a basic understanding of some aspects described herein. This summary is not an extensive overview, and is not intended to identify key/critical elements or to delineate the scope of the claimed subject matter. Moreover, in some embodiments, all the features disclosed herein may be included in a single device, while in other embodiments, one or more such features may be present.

BRIEF DESCRIPTION OF THE DRAWINGS

So that those having ordinary skill in the art will have a better understanding of how to make and use the disclosed systems and methods, reference is made to the accompanying figures wherein.

DETAILED DESCRIPTION

Figure 1:
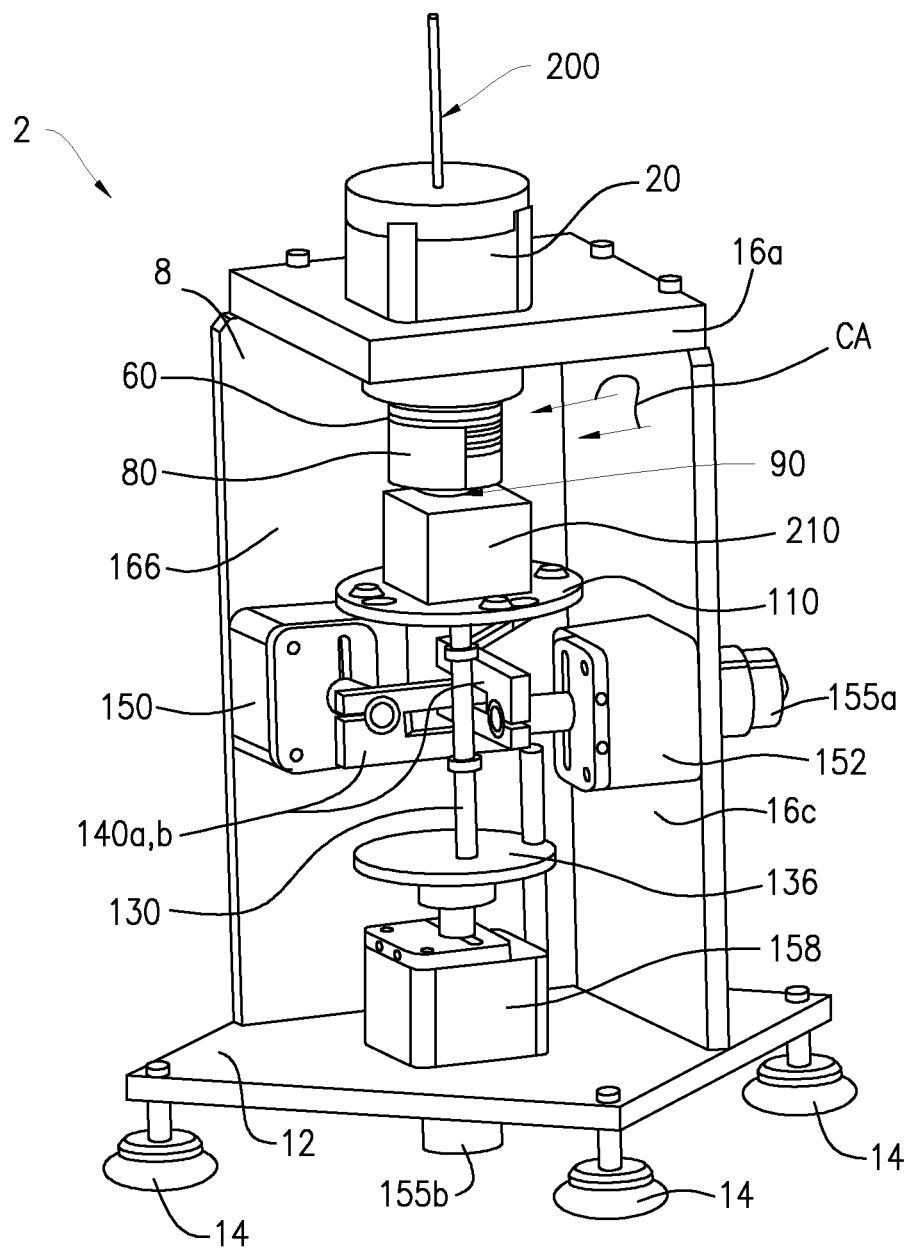
FIG. 1 is a perspective view of a 3D printing device in accordance with one or more embodiments of the disclosed subject matter.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

With reference to FIG. 1, in one or more embodiments a 3D printing device 2 in accordance with the present disclosure includes a frame 8, base 12, feet 14 coupled to the base, supports 16a, 16b and 16c, feed stepper motor 20 mounted to support 16a, extruder 60 coupled to the feed stepper motor 20, platen 110, platen support 130 coupled to platen lifter 136, x- and y-direction stepper motor positioners 140a and 140b, respectively, coupled to platen support 130, x- and y-direction stepper motors 150 and 152, respectively, coupled to supports 16b and 16c and x- and y-direction stepper motor positioners 140a and 140b respectively, a z-direction stepper motor 158 coupled to the base 12 and platen lifter 136. In one or more embodiments the platen lifter 136 is made of ferric material and a magnet is located in the end of the platen support 130 to ensure the platen 110 lowers when the platen lifter 136 is lowered.

Figure 4:
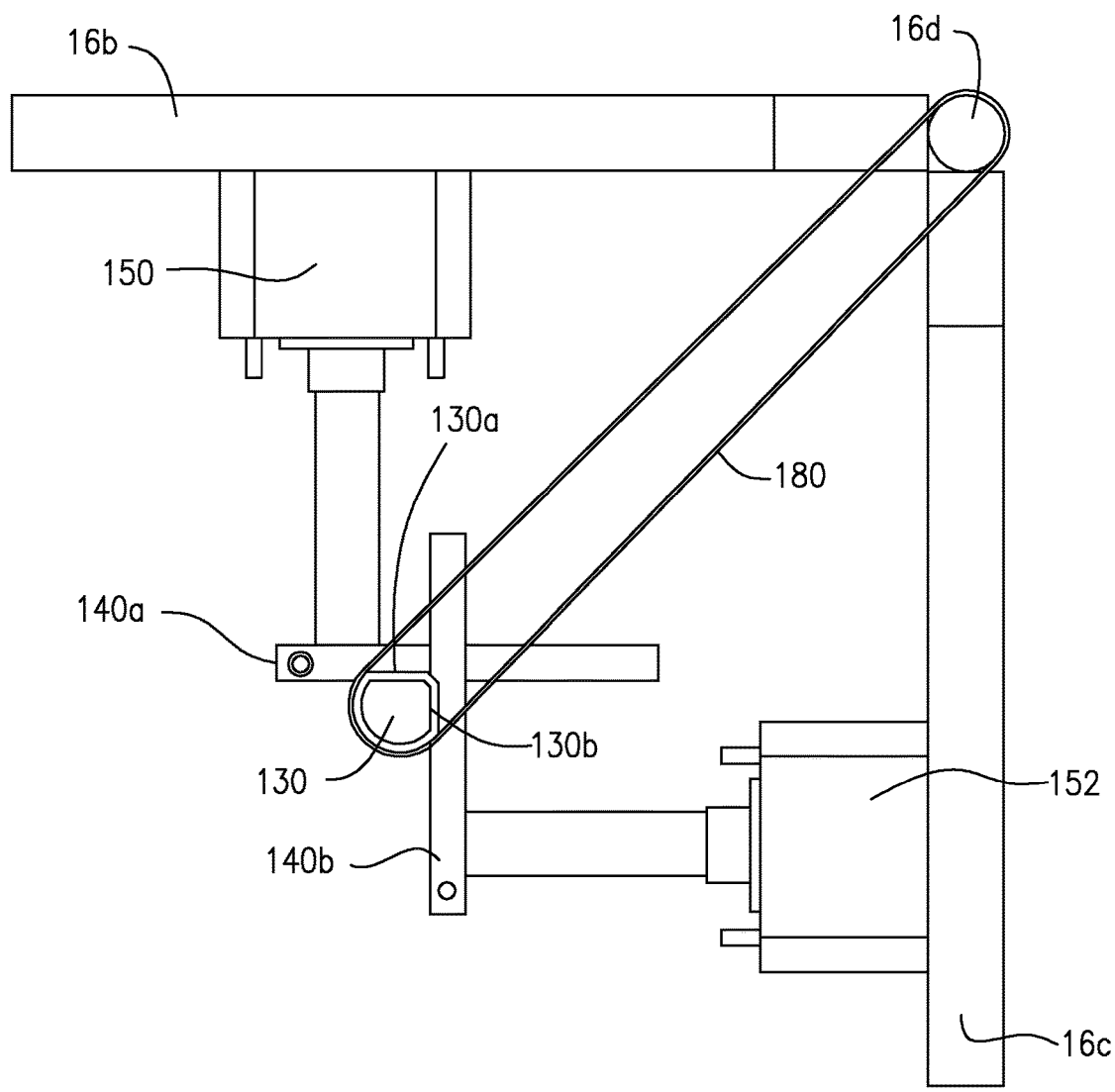
FIG. 4 is a top view of a tensioner operable to maintain the platen support in snug engagement with the x- and y-direction stepper motor positioners in accordance with one or more embodiments of the disclosed subject matter.

With further reference to FIG. 4, the platen support 130 is kept in snug engagement with the x- and y-direction stepper motor positioners 140a and 140b by a tensioner 180 to maintain the perpendicular nest of the positioners 140a and 140b. The tensioner 180 may be any suitable device such as one or more tension springs, rubber band(s), bungee cords(s), extension springs, etc. In the non-limiting embodiment shown, the tensioner 180 is a rubber band, with one end anchored to a back corner 16d of a frame 8, and the other end attached to the platen support 130. One or more bushings (not shown) may be employed on the platen support 130 and/or the back corner 16d for the tensioner 180 to engage to maintain the tensioner 180 in a desired position and prevent displacement of the tensioner 180 when the platen support 130 moves up or down. In one or more embodiments, the platen support 130 has surfaces 130a and 130b which are flat and perpendicular to each other, enabling secure nesting of the platen support 130 with the x- and y-direction stepper motor positioners 140a and 140b.

The feed stepper motor 20 and x-, y-, and z-direction stepper motors 150, 152 and 158 may be any suitable stepper motors well known in the art such as but not limited to NEMA 14, NEMA 17, NEMA 23, NEMA 34 stepper motors, etc. The feet 14 may be adjustable leveling feet. The x-, y-, and z-direction stepper motors 150, 152 and 158 may be coupled to the supports 16b, 16c and base 12, respectively, using lead screw clamps such as 155a and 155b.

As is well-known in the art the stepper motors 20, 150, 152 and 158 may be operably coupled to a computing device operable to carry out computing activity (e.g., the execution of suitable software code) in connection with implementing the functions and actions of the 3D printer devices and methods disclosed and described herein.

By way of example, a computing device may be implemented using know hardware, firmware, and/or software, as well as specialized software for carrying out 3D printing operations, such as but not limited to Blender™, SketchUp™, SolidWorks™ Fusion 360™, etc. 3D printer software. For example, the user computer may include a data processing unit (or processor) and a memory operatively coupled by way of a data and/or instruction bus. The processor may be implemented utilizing any of the known hardware, such as a digital microprocessor, a computer (such as a portable, a stationary and/or a distributed computing system), or any of the other known and/or hereinafter developed data processing units. The memory may be implemented by way of separate hardware or may be disposed within the data processing unit, and any of the known hardware and/or software for implementing the memory function may be employed.

Data are preferably input to, and output from, the data processing unit by way of an input/output device (or I/O interface). Operators may desire to input software programs and/or data into the computer by way of an external memory that is coupled to the I/O interface by way of a suitable link (such as a cable, wireless link, etc.) The external memory may be implemented via a flash-drive, disc, remotely located memory device, etc.

The computer may also include an interface device, which is operatively coupled to the I/O interface of the computer via a suitable link, such as a cable, wireless link, etc. The interface device includes at least one display as well as an input device, such as a keyboard, mouse, voice recognition system, etc. An operator preferably utilizes the interface device to provide information to the computer in connection with entering appropriate data and/or programs. The computer manipulates data via suitable software code in accordance with various embodiments of the invention and may display results on the display for consideration by an operator. In accordance with well-known techniques, the results may also be stored within the memory of the computer, output and saved on the external memory device, and/or provided in any of a number of other ways.

Figure 2:
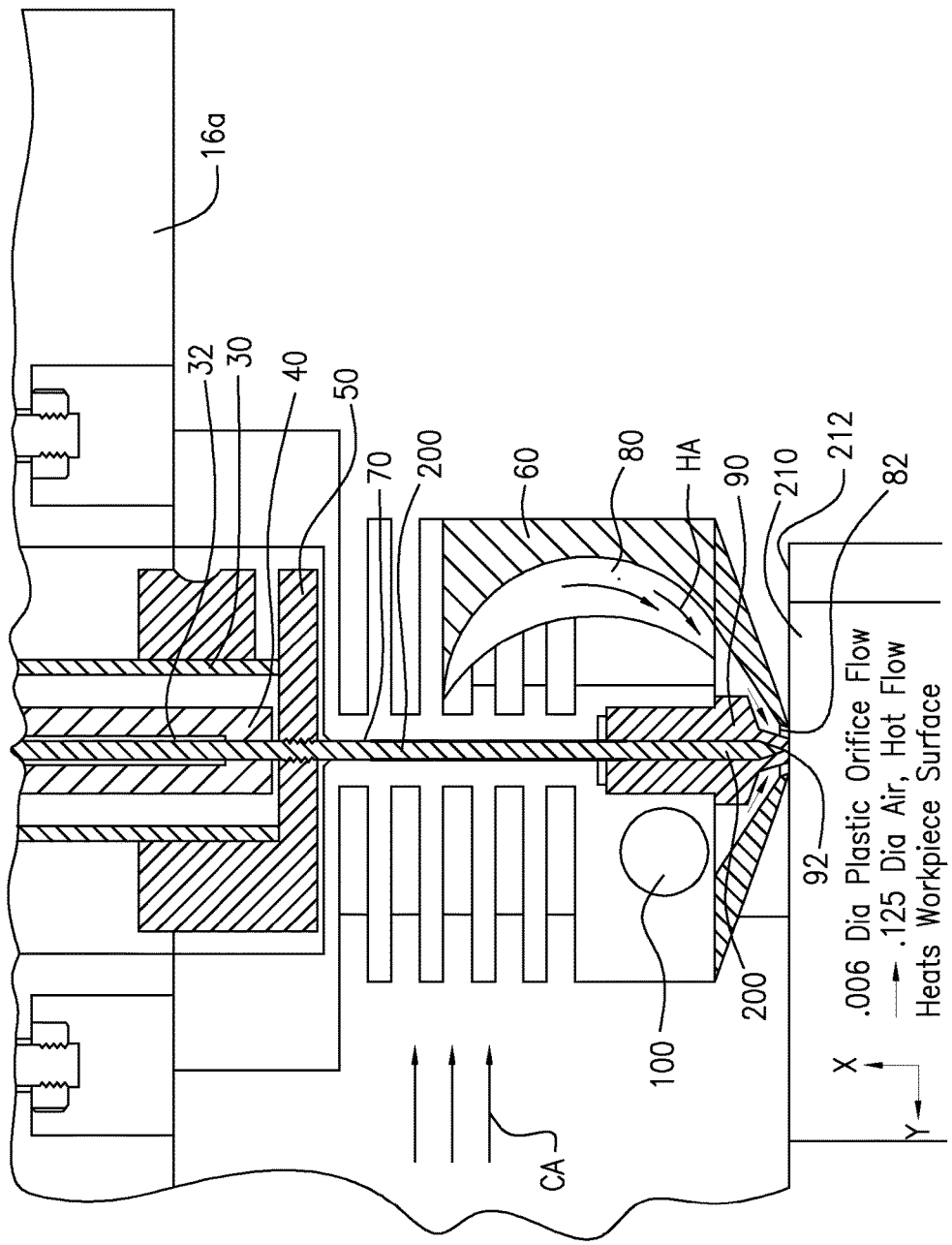
FIG. 2 is a cross-sectional view of 3D printing device feed stepper motor including a stepper motor shaft, square hole fixed bushing, threaded nut clamped to motor shaft, heater, filament, extruder, nozzle and workpiece in accordance with one or more embodiments of the disclosed subject matter.

With further reference to FIG. 2, in one or more embodiments the feed stepper motor 20 includes a hollow-bore motor shaft 30 having a bore 32 configured and operable to receive and feed to extruder 60 a filament 200 for use in creating a 3D workpiece 210. The motor shaft 30 may include a feed stepper motor bushing 40, feed stepper motor nut 50 and bushing hole 70. This arrangement allows the lead screw and nut 50 to be housed within the feed stepper motor 20. The resulting frame is compact and very rigid.

In one or more embodiments the bore 32 has a square cross-section which can accommodate a filament with a square cross-section. This allows a much more compact square-bored bushing with a threaded nut feeding a square sectioned filament. Extruder 60 includes air scoop 80, extruder nozzle 90 and heater 100. Extruder nozzle 90 includes extruder orifice 92 and may be brass or any material suitable to be withstand temperatures adequate to soften a filament 200. In one or more embodiments the extruder orifice 92 has a diameter of about 0.004-0.01 inches. In some embodiments the extruder orifice 92 has a diameter of 0.006 inches. The heater 100 may be any suitable heating device, such as but not limited to laser, a heat exchanger, heating filament, etc. In an exemplary embodiment, the heater 100 is positioned to heat the extruder nozzle 90 and a portion of the cooling air CA.

The cooling air CA may be fan driven to keep the filament 200 being fed downward into the extrusion nozzle 90 stiff and well below its softening temperature. A portion of cooling air CA is directed into an opening of the air scoop 80 and channeled by the air scoop 80 to be heated by heater 100. This heated air HA passes through air scoop 80 which is configured and positioned to route heated air HA to be emitted through air scoop orifice 82. Air scoop orifice 82 may have a diameter of about 0.125-0.250 inches and is arranged adjacent the extruder orifice 92. In one or more embodiments the air scoop orifice 82 is arranged concentrically with extruder orifice 92, through which the softened plastic bead of filament 200 is extruded. The heated air HA heats the top surface 212 of the workpiece 210 to an appropriate temperature, so that the extruded bead merges well with the workpiece 210 top surface 212. The temperature of the workpiece top surface 212 is controlled by how many BTUs are imparted. This in turn is controlled by the volume of heated air HA allowed to convey the heat, which can be controlled by a shutter valve well-known in the art positioned to provide adjustable air flow through the air scoop 80, adjusting the air volume to suit the relative motion of the workpiece 210. Thus, the top surface 212 of the workpiece 210 can be at a temperature just below that which will cause softening and/or distortion of the workpiece 210, and yet be enough to maximize the strength of the union between the extruded bead and the top surface 212. Regardless of which way the surface of the workpiece 210 is about to move, relative to the extruder nozzle 90, there will be a hot surface with which to merge.

Figure 3:
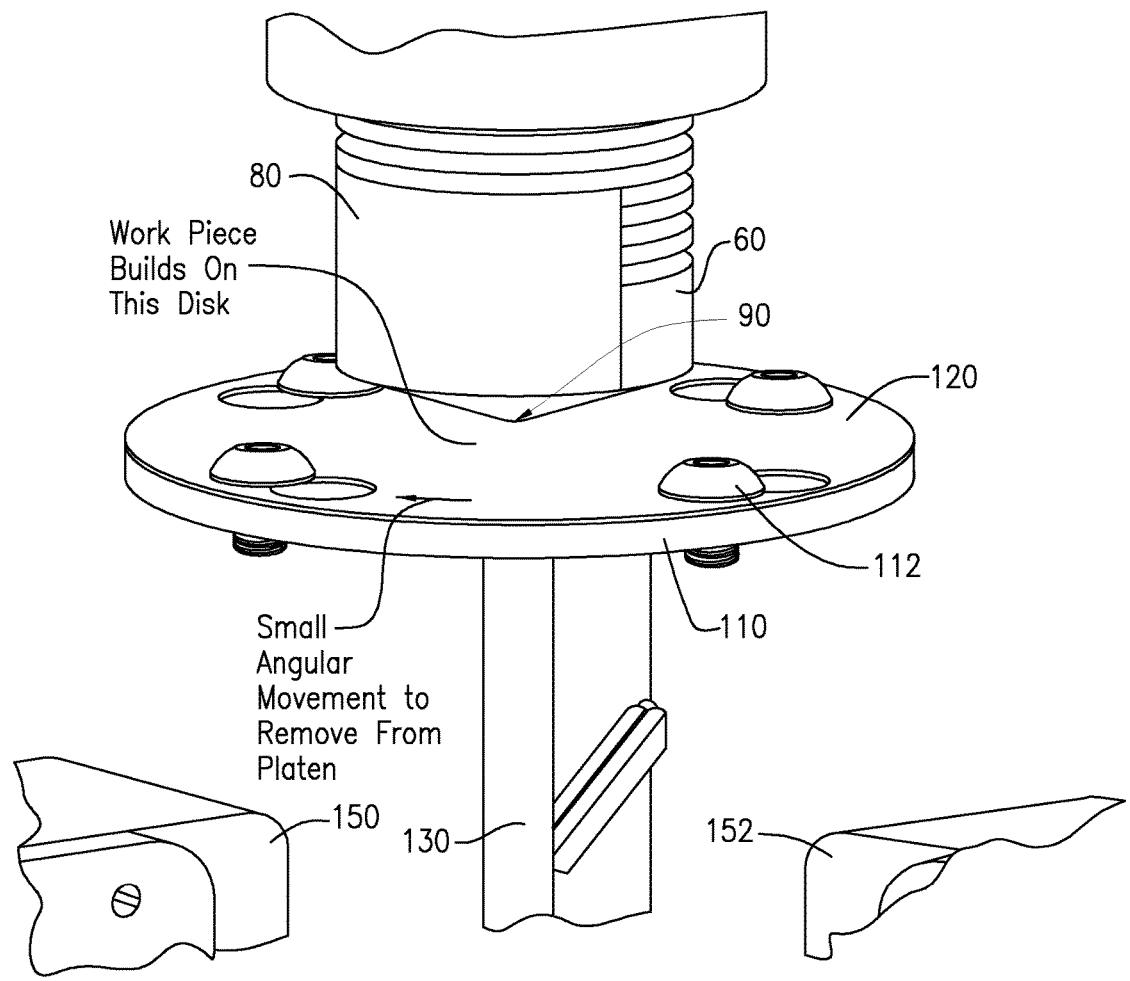
FIG. 3 is a perspective view of a platen, substrate supported on the platen and a nozzle in accordance with one or more embodiments of the disclosed subject matter.

Now referring to FIG. 3, in one embodiment a substrate 120, made from the same material as the filament 200 being extruded, is provided and coupled to the platen 110. The premade substrate 120 may for example be in the form of plastic disc, etc. Various known methods of coupling may be employed. For example and not by way of limitations, in one embodiment the platen 110 includes clamp screws 112 and the substrate 120 includes apertures 122 configured to accommodate the clamp screws 112 and engage the clamp screws 112 upon a small angular movement of the substrate 120. Printing then proceeds with the substrate 120 being heated and printed on, as described above, as if it were any layer. The resulting workpiece is then removed by de-coupling the substrate 120 from the platen 110. The substrate 120 is then trimmed from the workpiece as necessary.

3D printing devices as disclosed herein may be very compact. For example, in one example the entire device is less than 12" tall and the base plate measures 6"×6"×0.25".

Figure 5:
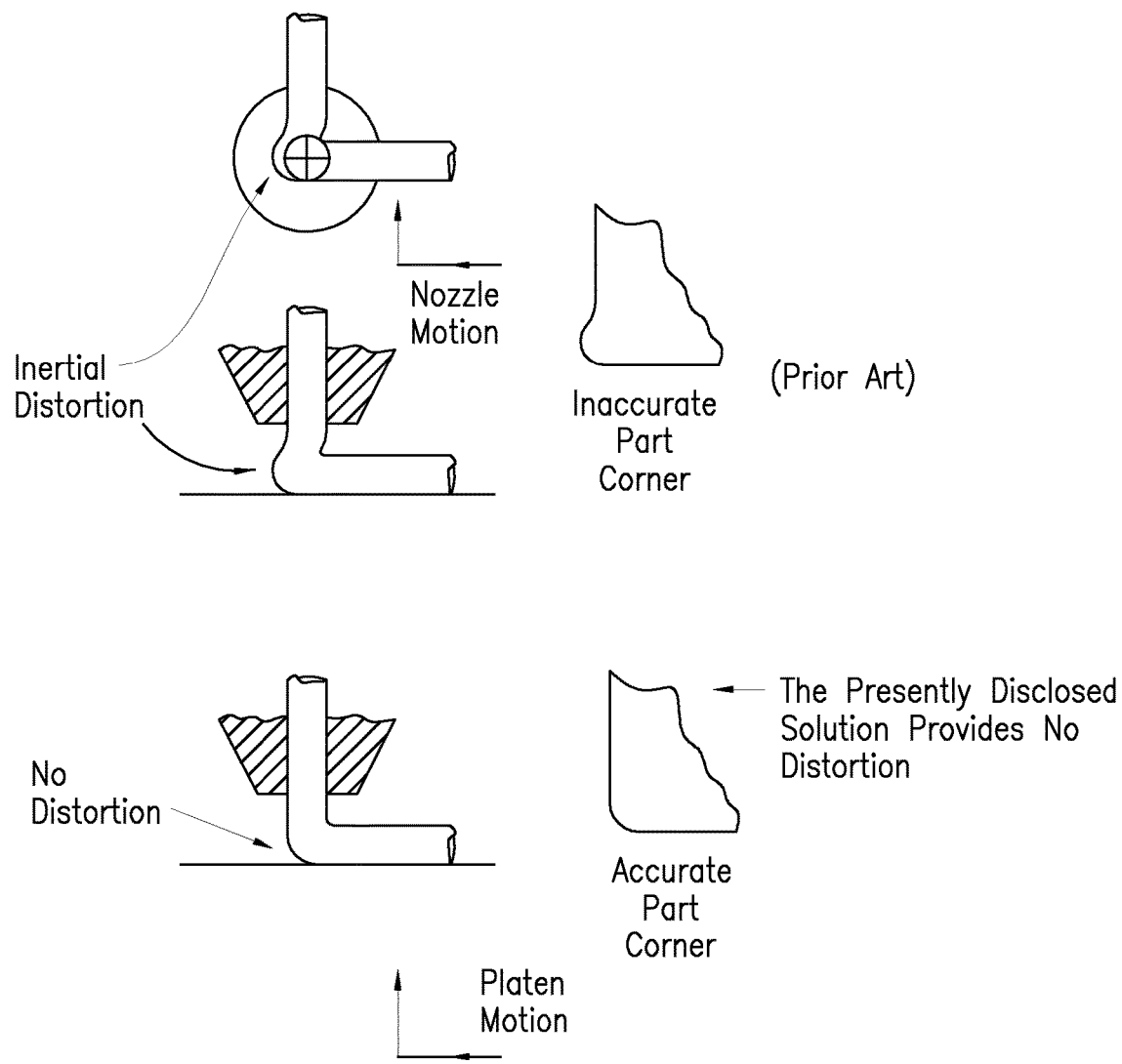
FIG. 5 is schematic comparing the results obtained in prior art methods of 3D printing with the results obtainable in accordance with one or more embodiments of the disclosed subject matter.

The devices disclosed herein are extremely light weight, which are easily moved in the 'x' and 'y' directions while the extruding nozzle is kept stationary. Now referring to FIG. 5, because of the light weight, when the relative motion of the moving platen stops, there is no sideways motion of the unsupported plastic bead, between the nozzle tip and the workpiece surface, and therefore a reduction in unwanted deposit. By comparison, in the prior art, when the nozzle is the moving element, each change in motion causes the unsupported bead's inertia to place plastic in unwanted, unspecified places, resulting in inaccurate parts.

Although the apparatus and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

What is claimed is:

1. A method of 3D printing by a 3D printing device, the method comprising:
   providing a 3D printing device comprising an extruder for extruding a filament material, wherein the extruder comprises an extrusion nozzle, a heater positioned within the extruder to heat both the extrusion nozzle and cooling air, a platen, and an air scoop positioned within the extruder to redirect a portion of the cooling air under heating applied by the heater and before being emitted as heated air adjacent the extrusion nozzle;
   coupling a substrate to the platen;
   providing the cooling air to the filament material so as to maintain a temperature of the filament material, a portion of the cooling air then being directed into an opening of and through the air scoop;
   heating the extrusion nozzle and the portion of the cooling air passing through the air scoop to provide heated air, the air scoop redirecting the portion of the air toward the substrate during said heating;
   routing the heated air directly onto the substrate to heat the substrate;

extruding the filament material through the extruder; and
creating a workpiece on the substrate by applying the extruded filament material to the heated substrate.

2. The method of 3D printing according to claim 1 further comprising removing the substrate and the workpiece from the platen and removing at least a part of the substrate from the workpiece.

3. The method of 3D printing according to claim 1, said routing comprising routing the heated air via the air scoop directly onto a top surface of the substrate.

4. The method of 3D printing according to claim 1 wherein the cooling air is fan driven.

5. The method of 3D printing according to claim 1 wherein the substrate is made from the same material as the filament material.

6. The method of 3D printing according to claim 1 wherein the maintained temperature of the filament material is well below its softening temperature.

7. The method of 3D printing according to claim 1 wherein said heating of the extrusion nozzle causes heating of the cooled filament material.

\* \* \* \* \*